(12) United States Patent  
Masunishi et al.

(10) Patent No.: US 12,467,941 B2  
(45) Date of Patent: Nov. 11, 2025

(54) SENSOR AND ELECTRONIC DEVICE

(71) Applicant: KABUSHIKI KAISHA TOSHIBA, Tokyo (JP)

(72) Inventors: Kei Masunishi, Kawasaki Kanagawa (JP); Etsuji Ogawa, Kawasaki Kanagawa (JP); Yasushi Tomizawa, Fuchu Tokyo (JP); Fumito Miyazaki, Yokohama Kanagawa (JP); Daki Ono, Yokohama Kanagawa (JP); Kengo Uchida, Kawasaki Kanagawa (JP); Hiroki Hiraga, Saitama Saitama (JP); Shiori Kaji, Kawasaki Kanagawa (JP); Hideaki Murase, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 340 days.

(21) Appl. No.: 18/175,242

(22) Filed: Feb. 27, 2023

(65) Prior Publication Data

US 2024/0085451 A1    Mar. 14, 2024

(30) Foreign Application Priority Data

Sep. 14, 2022    (JP) .................. 2022-146096

(51) Int. Cl.  
*G01P 15/097*    (2006.01)  
*G01P 15/08*    (2006.01)  
*G01P 15/18*    (2013.01)

(52) U.S. Cl.  
CPC ............ *G01P 15/097* (2013.01); *G01P 15/08* (2013.01); *G01P 15/0802* (2013.01); *G01P 15/18* (2013.01)

(58) Field of Classification Search  
CPC .... G01P 15/0802; G01P 15/097; G01P 15/18; G01P 15/08  
See application file for complete search history.

(56) References Cited

U.S. PATENT DOCUMENTS 10,866,258 B2    12/2020    Reinke  
2009/0255339 A1*    10/2009    McNeil ................. G01P 15/097  
29/596

(Continued)

FOREIGN PATENT DOCUMENTS

JP    2022-1828 A    1/2022

OTHER PUBLICATIONS

Guillermo Sobreviela-Falces et al., "A Navigation-Grade MEMS Vibrating Beam Accelerometer," 2022 IEEE 35th Int'l Conf. on Micro Electro Mechanical Systems Conference (MEMS), pp. 782-785, DOI: 10.1109/MEMS51670.2022.9699447 (2022).

(Continued)

*Primary Examiner* — Helen C Kwok  
(74) *Attorney, Agent, or Firm* — Finnegan, Henderson, Farabow, Garrett & Dunner, LLP

(57) ABSTRACT

According to one embodiment, a sensor includes a base body, a support portion fixed to the base body, and a first member supported by the support portion. A gap is provided between the base body and a part of the first member. The first member includes a supported region, a first movable region, a first structure, a first support structure, a first connection structure, a first connect portion, and a first beam. The support portion is located between the base body and the supported region in a first direction from the base body to the support portion. The first beam extends along a second direction crossing the first direction. A first beam position of the first beam is located between a first movable region position of the first movable region and a support (Continued)

portion position of the support portion in the second direction.

20 Claims, 8 Drawing Sheets

(56) References Cited

U.S. PATENT DOCUMENTS

| | | | |
|---|---|---|---|
| 2015/0226762 A1* | 8/2015 | Seshia | G01K 11/26 |
| | | | 73/495 |
| 2019/0187171 A1* | 6/2019 | Takizawa | G01P 15/0802 |
| 2021/0396780 A1 | 12/2021 | Masunishi et al. | |
| 2022/0259035 A1* | 8/2022 | Masunishi | B81B 3/0021 |

OTHER PUBLICATIONS

Dongsuk D. Shin et al., "Environmentally Robust Differential Resonant Accelerometer in a Wafer-Scale Encapsulation Process," IEEE 30th Int'l Conf. on Micro Electro Mechanical Systems (MEMS), pp. 17-20, DOI: 10.1109/MEMSYS.2017.7863328 (2017).

* cited by examiner

SENSOR AND ELECTRONIC DEVICE

CROSS-REFERENCE TO RELATED APPLICATIONS

This application is based upon and claims the benefit of priority from Japanese Patent Application No. 2022-146096, filed on Sep. 14, 2022; the entire contents of which are incorporated herein by reference.

FIELD

Embodiments described herein relate generally to a sensor and an electronic device.

BACKGROUND

For example, there is a sensor using a MEMS structure. In the sensor, stable detection is desired.

DETAILED DESCRIPTION

Figure 1:
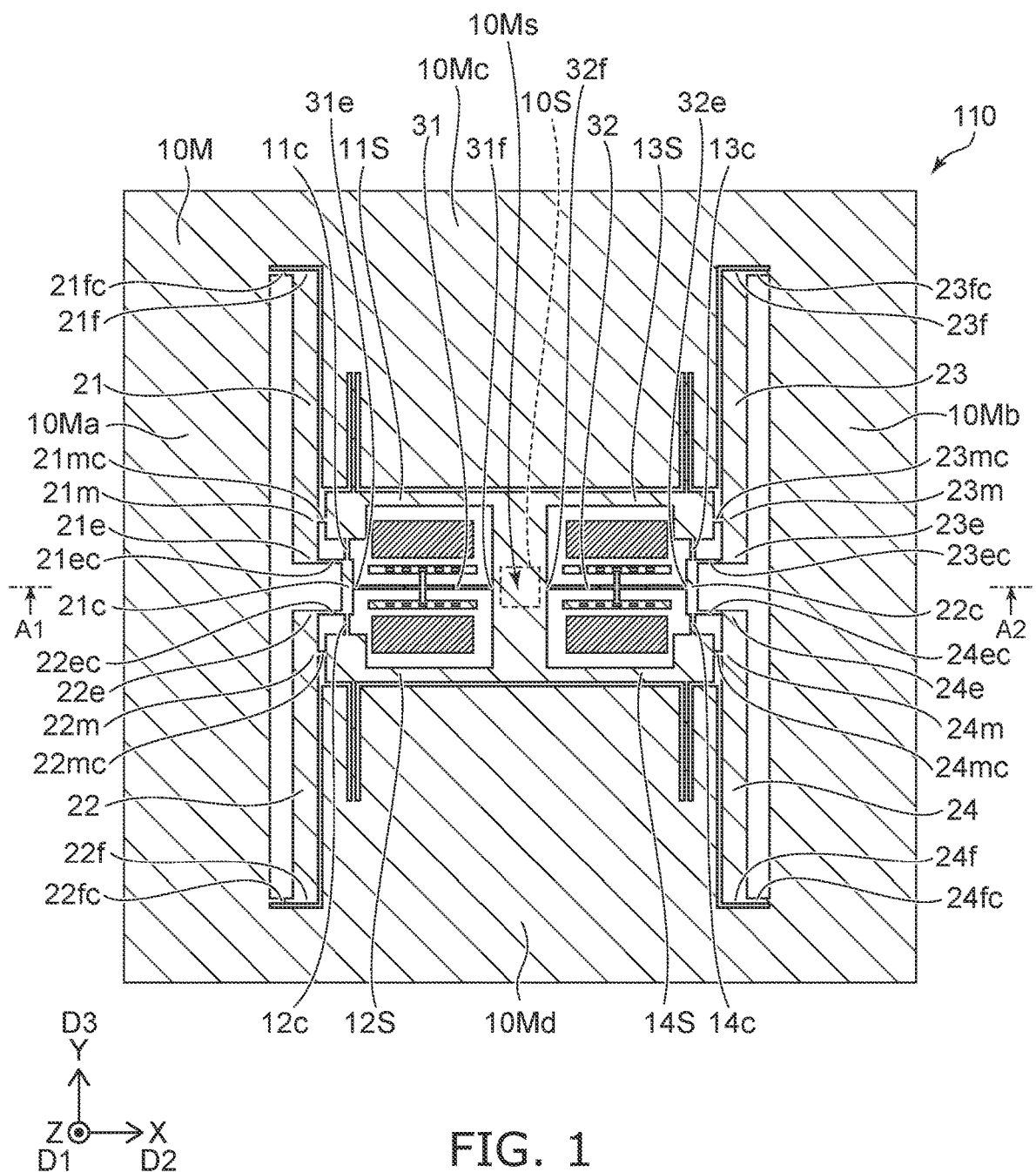
FIG. 1 is a schematic plan view illustrating a sensor according to a first embodiment.

According to one embodiment, a sensor includes a base body, a support portion fixed to the base body, and a first member supported by the support portion. A gap is provided between the base body and a part of the first member. The first member includes a supported region, a first movable region, a first structure, a first support structure, a first connection structure, a first connect portion, and a first beam. The support portion is located between the base body and the supported region in a first direction from the base body to the support portion. The first beam extends along a second direction crossing the first direction. A first beam position of the first beam in the second direction is located between a first movable region position of the first movable region in the second direction and a support portion position of the support portion in the second direction. A first end of the first beam is connected to the first connecting structure. A first other end of the first beam is connected to the supported region. A first structure position of the first structure in the second direction is located between the first movable region position and the first beam position. A first connection structure position of the first connection structure in the second direction is located between the first structure position and the first beam position. A first support structure position of the first support structure in the second direction is located between the first structure position and the support portion position. The first structure includes a first portion, a first other portion, and a first intermediate portion. A third direction from the first portion to the first other portion crosses a plane including the first direction and the second direction. The first intermediate portion is between the first portion and the first other portion. The first portion is connected to the first connection structure. The first other portion is connected to the first movable region. The first intermediate portion is connected to the first support structure. The first connect portion connects the first connection structure to the first support structure.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic plan view illustrating a sensor according to the first embodiment.

Figure 2:
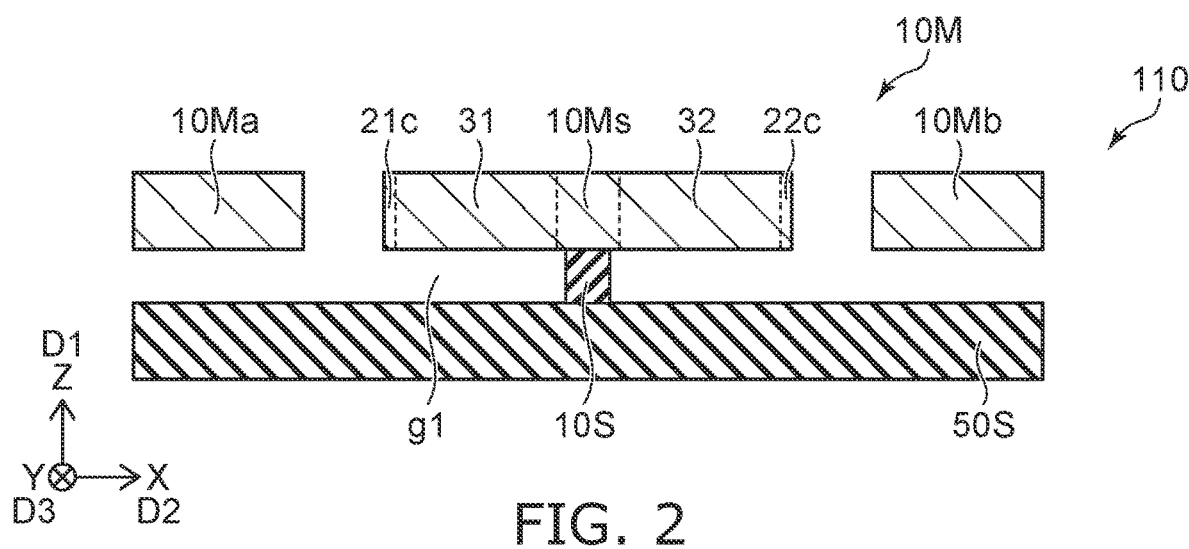
FIG. 2 is a schematic cross-sectional view illustrating the sensor according to the first embodiment.

FIG. 2 is a schematic cross-sectional view illustrating the sensor according to the first embodiment.

FIG. 2 is a cross-sectional view taken along the line A1-A2 of FIG. 1.

As shown in FIGS. 1 and 2, a sensor 110 according to the embodiment includes a base body 50S, a support portion 10S and a first member 10M.

As shown in FIG. 2, the support portion 10S is fixed to the base body 50S. The first member 10M is supported by the support portion 10S. A gap gi is provided between the base body 50S and a part of the first member 10M. At least a part of the first member 10M may be conductive.

A first direction D1 from the base body 50S to the support portion 10S is defined as a Z-axis direction. One direction perpendicular to the Z-axis direction is defined as an X-axis direction. The direction perpendicular to the Z-axis direction and the X-axis direction is defined as a Y-axis direction.

As shown in FIG. 1, the first member 10M includes a supported region 10Ms, a first movable region 10Ma, a first structure 21, a first support structure 11S, a first connection structure 21c, a first connect portion 11c and a first beam 31.

As shown in FIG. 2, the support portion 10S is provided between the base body 50S and the supported region 10Ms in the first direction D1.

The first beam 31 extends along a second direction D2. The second direction D2 crosses the first direction D1. The second direction D2 is, for example, the X-axis direction.

A first beam position of the first beam 31 in the second direction D2 is located between a first movable region position of the first movable region 10Ma in the second direction D2 and a support portion position of the support portion 10S in the second direction D2.

A first end 31e of the first beam 31 is connected to the first connection structure 21c. A first other end 31f of the first beam 31 is connected to the supported region 10Ms.

A first structure position of the first structure 21 in the second direction D2 is located between the first movable region position (the position of the first movable region 10Ma in the second direction D2) and the first beam position (the position of the first beam 31 in the second direction D2).

A first connection structure position of the first connection structure 21c in the second direction D2 is located between the first structure position and the first beam position. A first support structure position of the first support structure 11S in the second direction D2 is located between the first structure position and the support portion position.

The first structure 21 includes a first portion 21e, a first other portion 21f, and a first intermediate portion 21m. A third direction D3 from the first portion 21e to the first other portion 21f crosses a plane including the first direction D1 and the second direction D2. The first intermediate portion 21m is located between the first portion 21e and the first other portion 21f.

The first portion 21e is connected to the first connection structure 21c. The first other portion 21f is connected to the first movable region 10Ma. The first intermediate portion 21m is connected to the first support structure 11S.

For example, the first member 10M includes a first portion connect portion 21ec, a first other portion connect portion 21fc, and a first intermediate portion connect portion 21mc. The first portion connect portion 21ec connects the first portion 21e to the first connection structure 21c. The first other portion connect portion 21fc connects the first other portion 21f to the first movable region 10Ma. The first intermediate portion connect portion 21mc connects the first intermediate portion 21m to the first support structure 11S.

The first connect portion 11c connects the first connection structure 21c to the first support structure 11S.

For example, the first member 10M can move along the X-axis direction. In response to an external force, for example, the first movable region 10Ma moves along the X-axis direction. The movement of the first movable region 10Ma is transmitted to the first connection structure 21c by the first structure 21. The first structure 21 is, for example, a lever. The first portion 21e is, for example, a point of action. The first other portion 21f is, for example, a point of force. The first intermediate portion 21m is, for example, a fulcrum.

For example, stress along the X-axis direction is applied to the first connection structure 21c. As a result, compressive stress or tensile stress is applied to the first beam 31. As described later, when an AC signal is applied, the first beam 31 vibrates. The resonance frequency of the first beam 31 changes according to the stress applied to the first beam 31. By detecting a change in the resonance frequency of the first beam 31, it is possible to detect an externally applied force (e.g., acceleration).

In the embodiment, the first connection structure 21c is connected to the first support structure 11S by the first connect portion 11c. As a result, the movement of the first connection structure 21c is stabilized as compared with a reference example in which the first connection structure 21c is not connected to the first support structure 11S. As a result, stable detection can be achieved as compared with the reference example. A sensor that can improve detection accuracy can be provided.

As shown in FIG. 1, in this example, the first member 10M includes a second structure 22, a second support structure 12S, and a second connect portion 12c.

A second structure position of the second structure 22 in the second direction D2 is located between the first movable region position and the first beam position. A second support structure position of the second support structure 12S in the second direction D2 is located between the second structure position and the support portion position.

The second structure 22 includes a second portion 22e, a second other portion 22f, and a second intermediate portion 22m. A direction from the second other portion 22f to the second portion 22e is along the third direction D3. The second intermediate portion 22m is located between the second other portion 22f and the second portion 22e. The second portion 22e is connected to the first connection structure 21c. The second other portion 22f is connected to the first movable region 10Ma. The second intermediate portion 22m is connected to the second support structure 12S.

For example, the first member 10M includes a second portion connect portion 22ec, a second other portion connect portion 22fc, and a second intermediate portion connect portion 22mc. The second portion connect portion 22ec connects the second portion 22e to the first connection structure 21c. The second other portion connect portion 22fc connects the second other portion 22f to the first movable region 10Ma. The second intermediate portion connect portion 22mc connects the second intermediate portion 22m to the second support structure 12S.

The second connect portion 12c connects the first connection structure 21c to the second support structure 12S. By the first connection structure 21c being connected to the second support structure 12S, the first connection structure 21c becomes stable.

In the third direction D3, the first connection structure 21c is located between at least a part of the second support structure 12S and at least a part of the first support structure 11S. In the third direction D3, the first connect portion 11c is located between the first connection structure 21c and at least a part of the first support structure 11S. In the third direction D3, the second connect portion 12c is located between at least a part of the second support structure 12S and the first connection structure 21c.

For example, the movement of the first movable region 10Ma is transmitted to the first connection structure 21c by the second structure 22. The second structure 22 is, for example, a lever. The second portion 22e is, for example, a point of action. The second other portion 22f is, for example, a point of force. The second intermediate portion 22m is, for example, a fulcrum.

By providing the second structure 22 and the second support structure 12S, the first connection structure 21c is stabilized. More stable detection becomes possible.

As shown in FIG. 1, in this example, the first member 10M includes a second movable region 10Mb, a third structure 23, a third support structure 13S, a second connection structure 22c, a third connect portion 13c, and a second beam 32. In the second direction D2, the supported region 10Ms is located between the first movable region 10Ma and the second movable region 10Mb.

The second beam 32 extends along the second direction D2. A second beam position of the second beam 32 in the second direction D2 is located between the support portion position and a second movable region position of the second movable region Mb in the second direction D2. A second end 32e of the second beam 32 is connected to the second connection structure 22c. A second other end 32f of the second beam 32 is connected to the supported region 10Ms.

A third structure position of the third structure 23 in the second direction D2 is located between the second beam position and the second movable region position. A second connection structure position of the second connection structure 22c in the second direction D2 is located between the second beam position and the third structure position. A third support structure position of the third support structure 13S in the second direction D2 is located between the support portion position and the third structure position.

The third structure 23 includes a third portion 23e, a third other portion 23f, and a third intermediate portion 23m. A direction from the third portion 23e to the third other portion 23f is along the third direction D3. The third intermediate portion 23m is located between the third portion 23e and the third other portion 23f.

The third portion 23e is connected to the second connection structure 22c. The third other portion 23f is connected to the second movable region 10Mb. The third intermediate portion 23m is connected to the third support structure 13S.

For example, the first member 10M includes a third portion connect portion 23ec, a third other portion connect portion 23fc, and a third intermediate portion connect portion 23mc. The third portion connect portion 23ec connects the third portion 23e to the second connection structure 22c. The third other portion connect portion 23fc connects the third other portion 23f to the second movable region 10Mb. The third intermediate portion connect portion 23mc connects the third intermediate portion 23m to the third support structure 13S.

The third connect portion 13c connects the second connection structure 22c to the third support structure 13S. By the second connection structure 22c being connected to the third support structure 13S, the second connection structure 22c is stabilized.

For example, the movement of the second movable region Mb is transmitted to the second connection structure 22c by the third structure 23. The third structure 23 is, for example, a lever. The third portion 23e is, for example, a point of action. The third other portion 23f is, for example, a point of force. The third intermediate portion 23m is, for example, a fulcrum.

As shown in FIG. 1, in this example, the first member 10M includes a fourth structure 24, a fourth support structure 14S, and a fourth connect portion 14c. A fourth structure position the fourth structure 24 in the second direction D2 is located between the second beam position and the second movable region position. A fourth support structure position of the fourth support structure 14S in the second direction D2 is located between the support portion position and the fourth structure position.

The fourth structure 24 includes a fourth portion 24e, a fourth other portion 24f, and a fourth intermediate portion 24m. A direction from the fourth other portion 24f to the fourth portion 24e is along the third direction D3. The fourth intermediate portion 24m is located between the fourth other portion 24f and the fourth portion 24e. The fourth portion 24e is connected to the second connection structure 22c. The fourth other portion 24f is connected to the second movable region 10Mb. The fourth intermediate portion 24m is connected to the fourth support structure 14S.

For example, the first member 10M includes a fourth portion connect portion 24ec, a fourth other portion connect portion 24fc, and a fourth intermediate portion connect portion 24mc. The fourth portion connect portion 24ec connects the fourth portion 24e to the second connection structure 22c. The fourth other portion connect portion 24fc connects the fourth other portion 24f to the second movable region 10Mb. The fourth intermediate portion connect portion 24mc connects the fourth intermediate portion 24m to the fourth support structure 14S.

The fourth connect portion 14c connects the second connection structure 22c to the fourth support structure 14S. By the second connection structure 22c beings connected to the fourth support structure 14S, the second connection structure 22c is stabilized.

In the third direction D3, the second connection structure 22c is located between at least a part of the fourth support structure 14S and at least a part of the third support structure 13S. In the third direction D3, the third connect portion 13c is located between the second connection structure 22c and at least a part of the third support structure 13S. In the third direction D3, the fourth connect portion 14c is located between at least a part of the fourth support structure 14S and the second connection structure 22c.

For example, the movement of the second movable region Mb is transmitted to the second connection structure 22c by the fourth structure 24. The fourth structure 24 is, for example, a lever. The fourth portion 24e is, for example, a point of action. The fourth other portion 24f is, for example, a point of force. The fourth intermediate portion 24m is, for example, a fulcrum.

Figure 3:
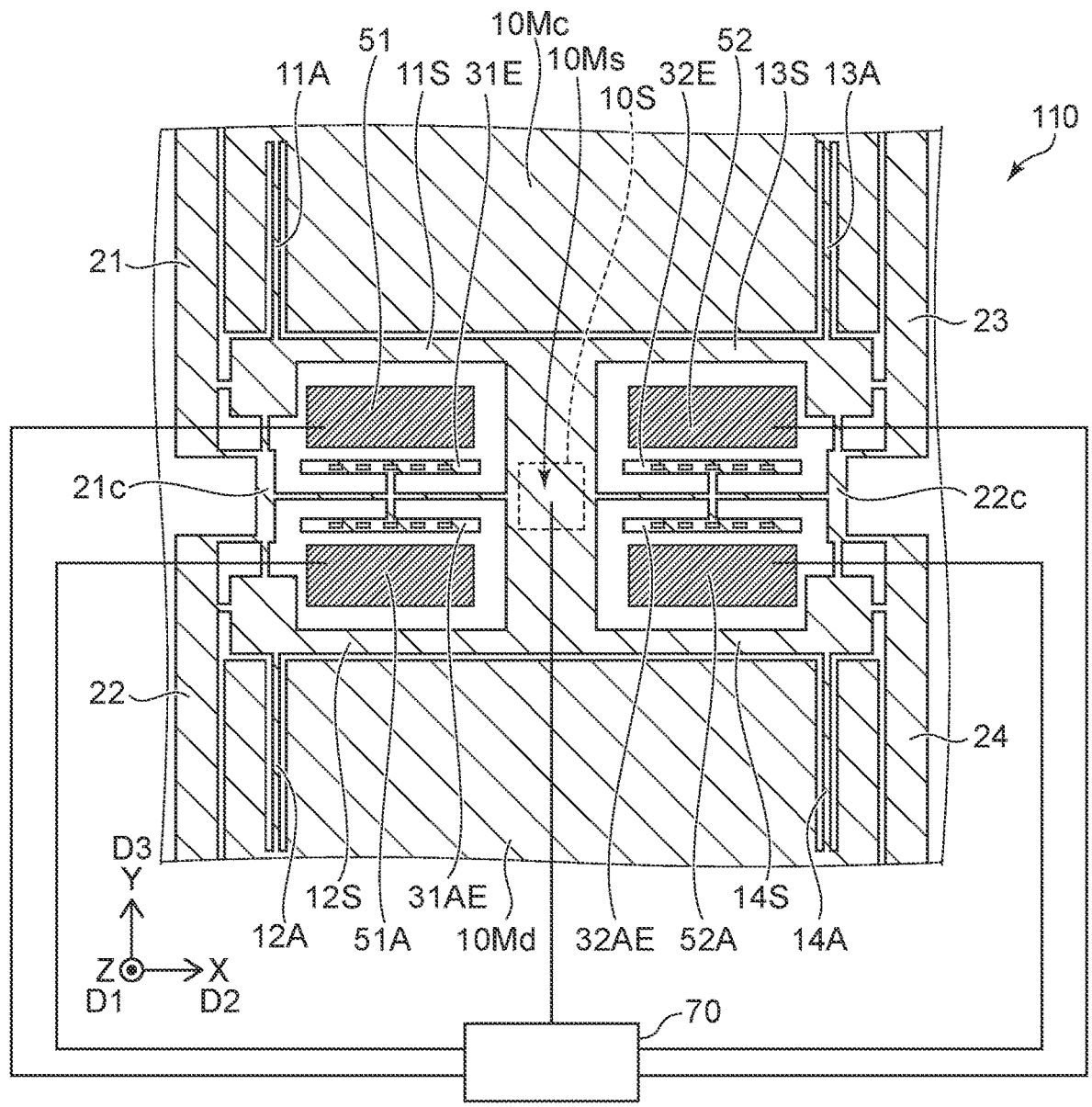
FIG. 3 is a schematic plan view illustrating a part of the sensor according to the first embodiment.

FIG. 3 is a schematic plan view illustrating a part of the sensor according to the first embodiment.

In FIG. 3, a portion of FIG. 1 is shown enlarged.

As shown in FIG. 3, the sensor 110 may include a first electrode 51 and a first counter electrode 51A. The first electrode 51 is fixed to the base body 50S. The first counter electrode 51A is fixed to the base body 50S.

The first member 10M further includes a first beam electrode 31E connected to the first beam 31 and a first counter beam electrode 31AE connected to the first beam 31. For example, in the third direction D3, the first beam 31 is located between the first counter beam electrode 31AE and the first beam electrode 31E. The first electrode 51 faces the first beam electrode 31E. The first counter electrode 51A faces the first counter beam electrode 31AE.

As shown in FIG. 3, the controller 70 may be provided. The controller 70 may be included in the sensor 110. The controller 70 may be provided separately from the sensor 110.

The controller 70 is electrically connected to the first electrode 51, the first counter electrode 51A, the first beam electrode 31E, and the first counter beam electrode 31AE. For example, the first beam electrode 31E and the first counter beam electrode 31AE are electrically connected to the first member 10M (for example, the supported region 10Ms).

The controller 70 is configured to apply a driving signal including an AC component between the first electrode 51 and the first beam electrode 31E. The controller 70 is configured to detect an electric signal generated between the first counter electrode 51A and the first counter beam electrode 31AE. By detecting a change in the electric signal generated between the first counter electrode 51A and the first counter beam electrode 31AE, an external force can be detected.

As shown in FIG. 3, the sensor 110 may include a second electrode 52 and a second counter electrode 52A. The second electrode 52 is fixed to the base body 50S. The second counter electrode 52A is fixed to the base body 50S.

The first member 10M may further include a second beam electrode 32E connected to the second beam 32 and a second counter beam electrode 32AE connected to the second beam 32. In the third direction D3, the second beam 32 is located between the second counter beam electrode 32AE and the second beam electrode 32E. The second electrode 52 faces the second beam electrode 32E. The second counter electrode 52A faces the second counter beam electrode 32AE. For example, the second beam electrode 32E and the second counter beam electrode 32AE are electrically connected to the first member 10M (for example, the supported region 10Ms).

The controller 70 is configured to apply the drive signal including an AC component between the second electrode 52 and the second beam electrode 32E. The controller 70 is configured to detect an electric signal generated between the second counter electrode 52A and the second counter beam electrode 32AE.

As shown in FIG. 1, the first member 10M may include a third movable region 10Mc and a fourth movable region 10Md. A direction from the fourth movable region 10Md to the third movable region 10Mc is along the third direction D3. The third movable region 10Mc and the fourth movable region 10Md are continuous with the first movable region 10Ma and the second movable region 10Mb. The supported region 10Ms is provided between the third movable region 10Mc and the fourth movable region 10Md.

As shown in FIG. 3, the first member 10M may further include a first movable region connect portion 11A. A position of the first support structure 11S in the third direction D3 is located between a position of the supported region 10Ms in the third direction D3 and a position of the third movable region 10Mc in the third direction D3. The first movable region connect portion 11A connects the first support structure 11S to the third movable region 10Mc. By providing the first movable region connect portion 11A, the displacement of the first member 10M along the second direction D2 is stabilized.

As shown in FIG. 3, the first member 10M may further include a second movable region connect portion 12A. A position of the second support structure 12S in the third direction D3 is located between a position of the fourth movable region 10Md in the third direction D3 and the position of the supported region 10Ms in the third direction D3. The second movable region connect portion 12A connects the second support structure 12S to the fourth movable region 10Md. By providing the second movable region connect portion 12A, the displacement of the first member 10M along the second direction D2 is stabilized.

As shown in FIG. 3, the first member 10M may further include a third movable region connect portion 13A. A position of the third support structure 13S in the third direction D3 is located between the position of the supported region 10Ms in the third direction D3 and the position of the third movable region 10Mc in the third direction D3. The third movable region connect portion 13A connects the third support structure 13S to the third movable region 10Mc. By providing the third movable region connect portion 13A, the displacement of the first member 10M along the second direction D2 is stabilized.

As shown in FIG. 3, the first member 10M may further include a fourth movable region connect portion 14A. A position of the fourth support structure 14S in the third direction D3 is located between the position of the fourth movable region 10Md in the third direction D3 and the position of the supported region 10Ms in the third direction D3. The fourth movable region connect portion 14A connects the fourth support structure 14S to the fourth movable region 10Md. By providing the fourth movable region connect portion 14A, the displacement of the first member 10M along the second direction D2 is stabilized.

Figure 4:
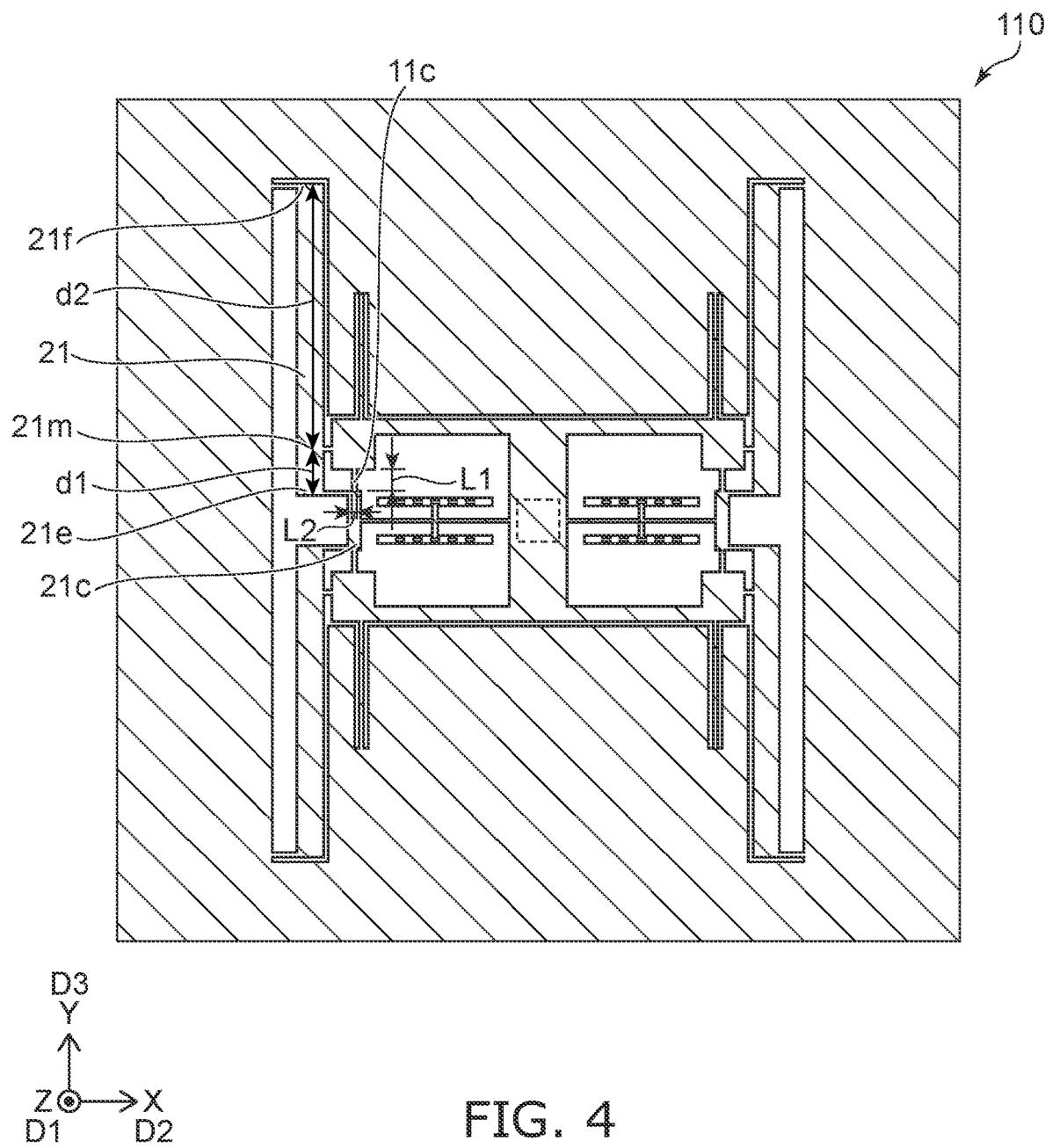
FIG. 4 is a schematic plan view illustrating the sensor according to the first embodiment.

FIG. 4 is a schematic plan view illustrating the sensor according to the first embodiment.

In FIG. 4, a portion of FIG. 1 is shown enlarged.

As shown in FIG. 4, a length of the first connect portion 11c along the third direction D3 is defined as a first length L1. A length of the first connect portion 11c along the second direction D2 is defined as a second length L2. For example, the first length L1 is longer than the second length L2. The first connection structure 21c connected to the first connect portion 11c can be easily displaced along the second direction D2. The position of the first connection structure 21c in the third direction D3 becomes stable.

As shown in FIG. 4, a distance between the first portion 21e and the first intermediate portion 21m along the third direction D3 is defined as a first distance d1. A distance between the first intermediate portion 21m and the first other portion 21f along the third direction D3 is defined as a second distance d2. The first distance d1 is shorter than the second distance d2. The first structure 21 efficiently transmits, for example, the displacement of the first movable region 10Ma along the second direction D2 to the first connection structure 21c.

The configuration relating to the first connect portion 11c can be applied to the second connect portion 12c, the third connect portion 13c, and the fourth connect portion 14c. The configuration relating to the first structure 21 can be applied to the second structure 22, the third structure 23 and the fourth structure 24.

Figure 5:
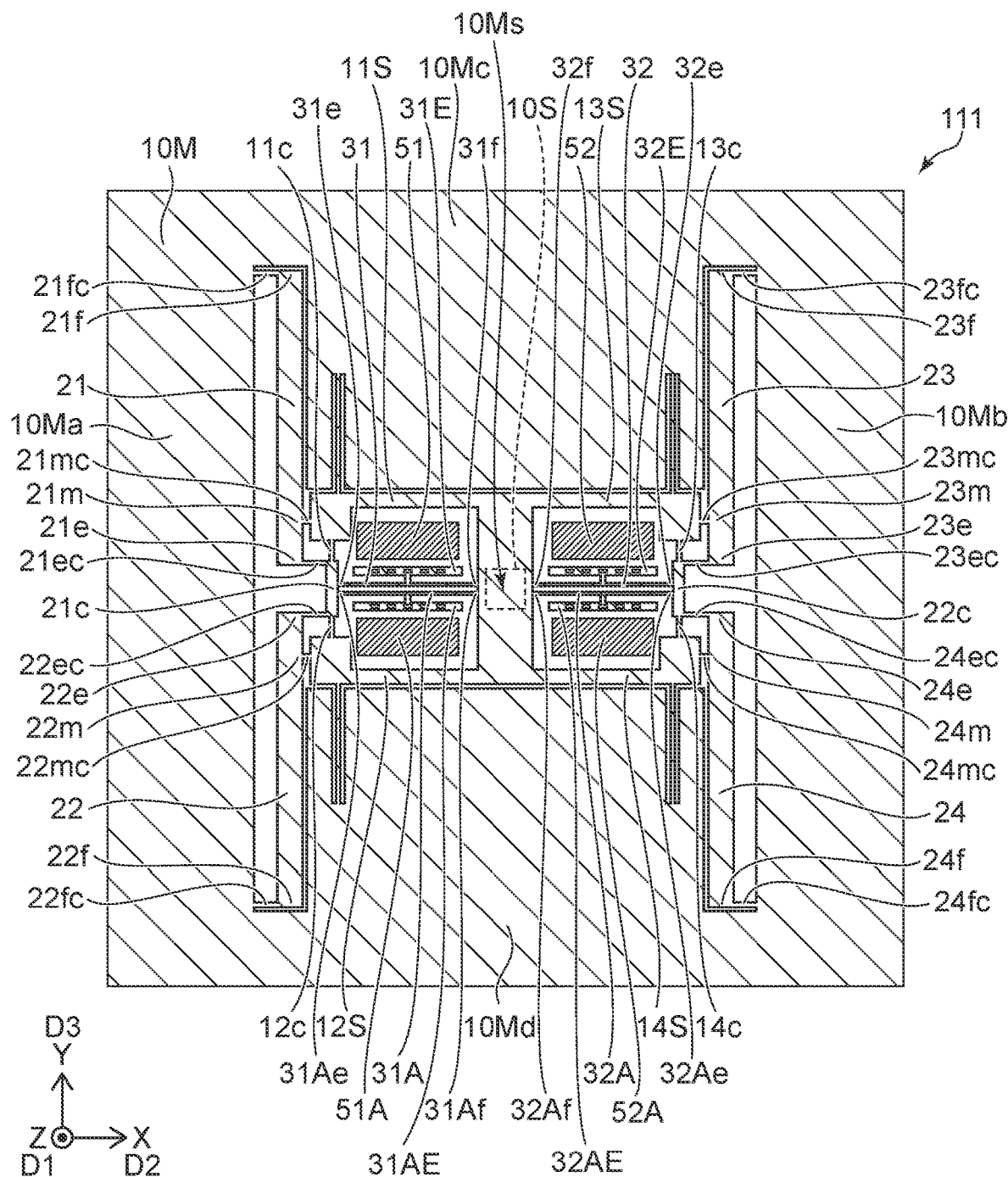
FIG. 5 is a schematic plan view illustrating a sensor according to the first embodiment.

FIG. 5 is a schematic plan view illustrating a sensor according to the first embodiment.

As shown in FIG. 5, a sensor 111 according to the embodiment also includes the base body 50S, the support portion 10S, and the first member 10M. In the sensor 111, the first member 10M includes a first counter beam 31A and a second counter beam 32A. Except for this, the configuration of the sensor 111 may be the same as the configuration of the sensor 110.

The configuration of the first structure 21, the first support structure 11S, the first connection structure 21c, the first connect portion 11c, and the first beam 31 in the sensor 111 may be the same as the configurations of those in the sensor 110.

In the sensor 111, the first member 10M includes the second structure 22, the second support structure 12S, the second connect portion 12c, and the first counter beam 31A. The first counter beam 31A extends along the second direction D2. The second structure position of the second structure 22 in the second direction D2 is located between the first movable region position and a first counter beam position of the first counter beam 31A in the second direction D2. A first counter beam end 31Ae of the first counter beam 31A is connected to the first connection structure 21c. A first counter beam other end 31Af of the first counter beam 31A is connected to the supported region 10Ms. A second support structure position of the second support structure 12S in the second direction D2 is located between the second structure position and the support portion position.

The second structure 22 includes the second portion 22e, the second other portion 22f, and a second intermediate portion 22m. The direction from the second other portion 22f to the second portion 22e is along the third direction D3. The second intermediate portion 22m is located between the second other portion 22f and the second portion 22e. The second portion 22e is connected to the first connection structure 21c. The second other portion 22f is connected to the first movable region 10Ma. The second intermediate portion 22m is connected to the second support structure 12S.

The second connect portion 12c connects the first connection structure 21c to the second support structure 12S. In the third direction D3, the first connection structure 21c is located between at least a part of the second support structure 12S and at least a part of the first support structure 11S. In the third direction D3, the first connect portion 11c is located between the first connection structure 21c and at least a part of the first support structure 11S. In the third direction D3, the second connect portion 12c is located between at least a part of the second support structure 12S and the first connection structure 21c. In the third direction D3, the first counter beam 31A is located between the second support structure 12S and the first beam 31.

As shown in FIG. 5, the sensor 111 may include the first electrode 51 and the first counter electrode 51A. The first electrode 51 and the first counter electrode 51A are fixed to the base body 50S. The first member 10M may include the first beam electrode 31E connected to the first beam 31 and the first counter beam electrode 31AE connected to the first counter beam 31A. The first electrode 51 faces the first beam electrode 31E. The first counter electrode 51A is faces the first counter beam electrode 31AE.

As described with reference to FIG. 3, the controller 70 may be provided. The controller 70 is configured to apply the driving signal including an AC component between the first electrode 51 and the first beam electrode 31E. The controller 70 is configuration to detect the electric signal generated between the first counter electrode 51A and the first counter beam electrode 31AE.

As shown in FIG. 5, the first member 10M may include the second movable region 10Mb, the third structure 23, the third support structure 13S, the second connection structure 22c, the third connect portion 13c, and the second beam 32. In the second direction D2, the supported region 10Ms is located between the first movable region 10Ma and the second movable region 10Mb.

The second beam 32 extends along the second direction D2. A second beam position of the second beam 32 in the second direction D2 is located between the support portion position and a second movable region position of the second movable region Mb in the second direction D2. The second end 32e of the second beam 32 is connected to the second connection structure 22c. The second other end 32f of the second beam 32 is connected to the supported region 10Ms.

The third structure position of the third structure 23 in the second direction D2 is located between the second beam position and the second movable region position. The second connection structure position of the second connection structure 22c in the second direction D2 is located between the second beam position and the third structure position. The third support structure position of the third support structure 13S in the second direction D2 is located between the support portion position and the third structure position.

The third structure 23 includes the third portion 23e, the third other portion 23f, and the third intermediate portion 23m. The direction from the third portion 23e to the third other portion 23f is along the third direction D3. The third intermediate portion 23m is located between the third portion 23e and the third other portion 23f. The third portion 23e is connected to the second connection structure 22c. The third other portion 23f is connected to the second movable region 10Mb. The third intermediate portion 23m is connected to the third support structure 13S. The third connect portion 13c connects the second connection structure 22c to the third support structure 13S.

As shown in FIG. 5, the first member 10M includes the fourth structure 24, the fourth support structure 14S, the fourth connect portion 14c, and the second counter beam 32A. The second counter beam 32A extends along the second direction D2. The fourth structure position of the fourth structure 24 in the second direction D2 is located between the second counter beam position of the second counter beam 32A in the second direction D2 and the second movable region position. The second counter beam end 32Ae of the second counter beam 32A is connected to the second connection structure 22c. The second counter beam other end 32Af of the second counter beam 32A is connected to the supported region 10Ms. The fourth support structure position of the fourth support structure 14S in the second direction D2 is located between the support portion position and the fourth structure position.

The fourth structure 24 includes the fourth portion 24e, the fourth other portion 24f, and the fourth intermediate portion 24m. The direction from the fourth other portion 24f to the fourth portion 24e is along the third direction D3. The fourth intermediate portion 24m is located between the fourth other portion 24f and the fourth portion 24e. The fourth portion 24e is connected to the second connection structure 22c. The fourth other portion 24f is connected to the second movable region Mb. The fourth intermediate portion 24m is connected to the fourth support structure 14S.

The fourth connect portion 14c connects the second connection structure 22c to the fourth support structure 14S. In the third direction D3, the second connection structure 22c is located between at least a part of the fourth support structure 14S and at least a part of the third support structure 13S. In the third direction D3, the third connect portion 13c is located between the second connection structure 22c and at least a part of the third support structure 13S. In the third direction D3, the fourth connect portion 14c is located between at least a part of the fourth support structure 14S and the second connection structure 22c. In the third direction D3, the second counter beam 32A is located between the fourth support structure 14S and the second beam 32.

As shown in FIG. 5, the sensor 111 may include the second electrode 52 and the second counter electrode 52A. The second electrode 52 and the second counter electrode 52A are fixed to the base body 50S. The first member 10M may include the second beam electrode 32E connected to the second beam 32 and the second counter beam electrode 32AE connected to the second counter beam 32A. The second electrode 52 faces the second beam electrode 32E. The second counter electrode 52A faces the second counter beam electrode 32AE.

As described with reference to FIG. 3, the controller 70 may be provided. The controller 70 is configured to apply the drive signal including an AC component between the second electrode 52 and the second beam electrode 32E. The controller 70 is configured to detect the electric signal generated between the second counter electrode 52A and the second counter beam electrode 32AE.

In the sensor 111, the first beam 31 and the first counter beam 31A form one pair. The second beam 32 and the second counter beam 32A form another pair. For example, the vibration amplitude at the resonance frequency of the reverse phase mode becomes large. The mechanical Q factor (quality factor) increases. High precision detection becomes possible.

As described above, at least a part of the first member 10M may be conductive. The first member 10M may include, for example, conductive silicon. For example, at least one of the supported region 10Ms, the first support structure 11S, the second support structure 12S, the third support structure 13S, or the fourth support structure 14S may include a metal layer. For example, high thermal conductivity can be obtained.

Second Embodiment

A second embodiment relates to an electronic device.

Figure 6:
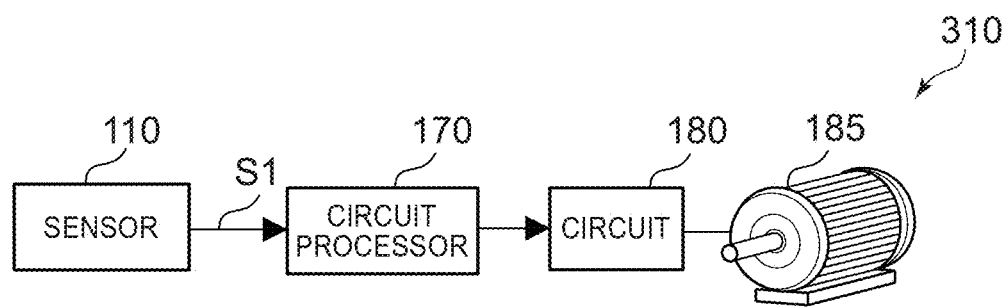
FIG. 6 is a schematic diagram illustrating an electronic device according to a second embodiment.

FIG. 6 is a schematic diagram illustrating an electronic device according to a second embodiment.

As shown in FIG. 6, an electronic device 310 according to the embodiment includes the sensors according to the first to third embodiments and the circuit processor 170. In the example of FIG. 6, the sensor 110 is drawn as the sensor. The circuit processor 170 is configured to control a circuit 180 based on the signal S1 obtained from the sensor. The circuit 180 is, for example, a control circuit for a drive device 185. According to the embodiment, for example, the circuit 180 for controlling the drive device 185 can be controlled with high accuracy.

FIGS. 7A to 7H are schematic views illustrating applications of the electronic device.

Figure 7A:
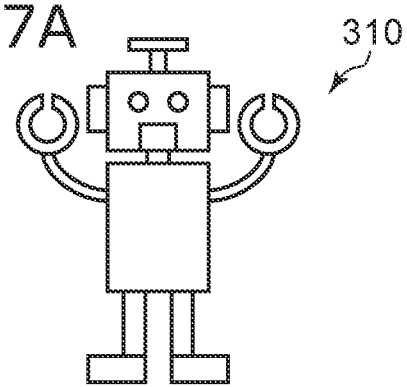
FIGS. 7A to 7H are schematic views illustrating applications of the electronic device.
Figure 7B:
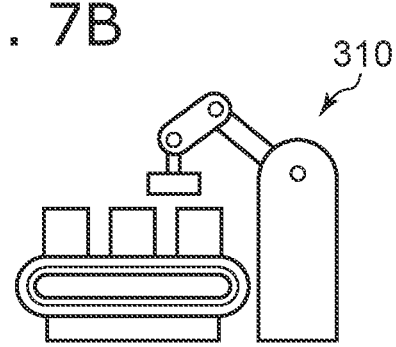
Figure 7C:
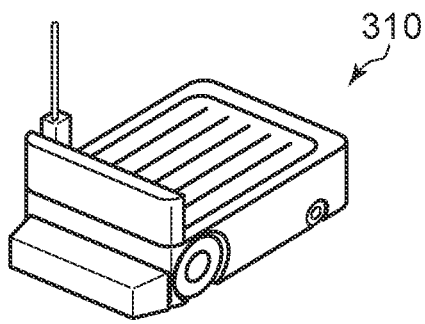
Figure 7D:
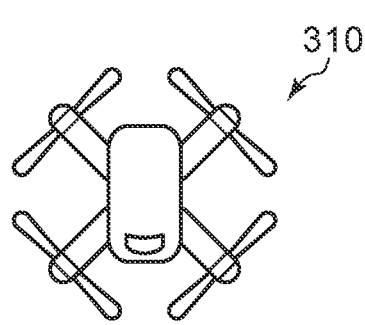
Figure 7E:
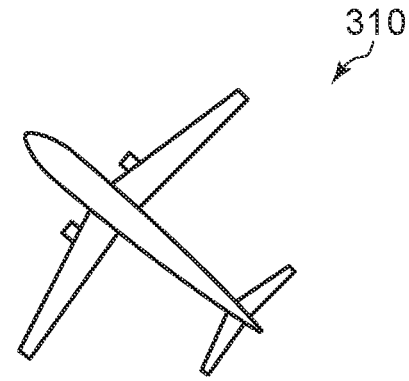
Figure 7F:
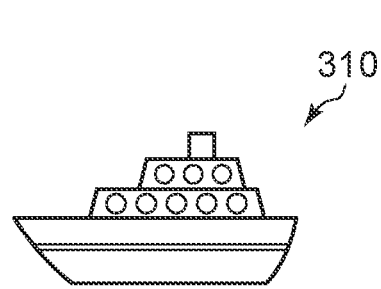
Figure 7G:
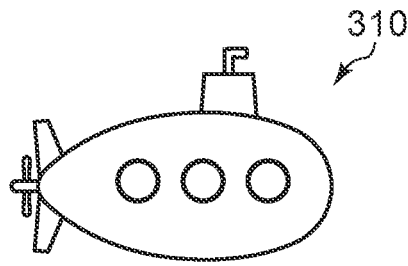
Figure 7H:
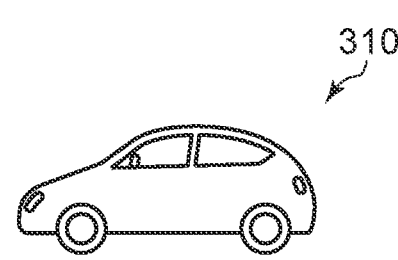

As shown in FIG. 7A, the electronic device 310 may be at least a portion of a robot. As shown in FIG. 7B, the electronic device 310 may be at least a portion of a machining robot provided in a manufacturing plant, etc. As shown in FIG. 7C, the electronic device 310 may be at least a portion of an automatic guided vehicle inside a plant, etc. As shown in FIG. 7D, the electronic device 310 may be at least a portion of a drone (an unmanned aircraft). As shown in FIG. 7E, the electronic device 310 may be at least a portion of an airplane. As shown in FIG. 7F, the electronic device 310 may be at least a portion of a ship. As shown in FIG. 7G, the electronic device 310 may be at least a portion of a submarine. As shown in FIG. 7H, the electronic device 310 may be at least a portion of an automobile. The electronic device 310 according to the third embodiment may include, for example, at least one of a robot or a moving body.

Figure 8A:
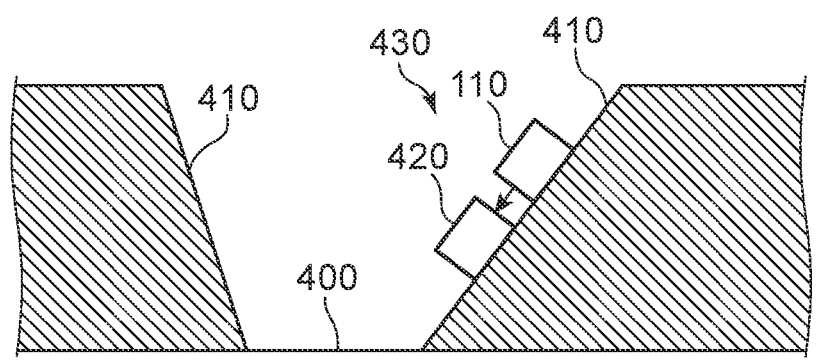
FIGS. 8A and 8B are schematic views illustrating applications of the electronic device.
Figure 8B:
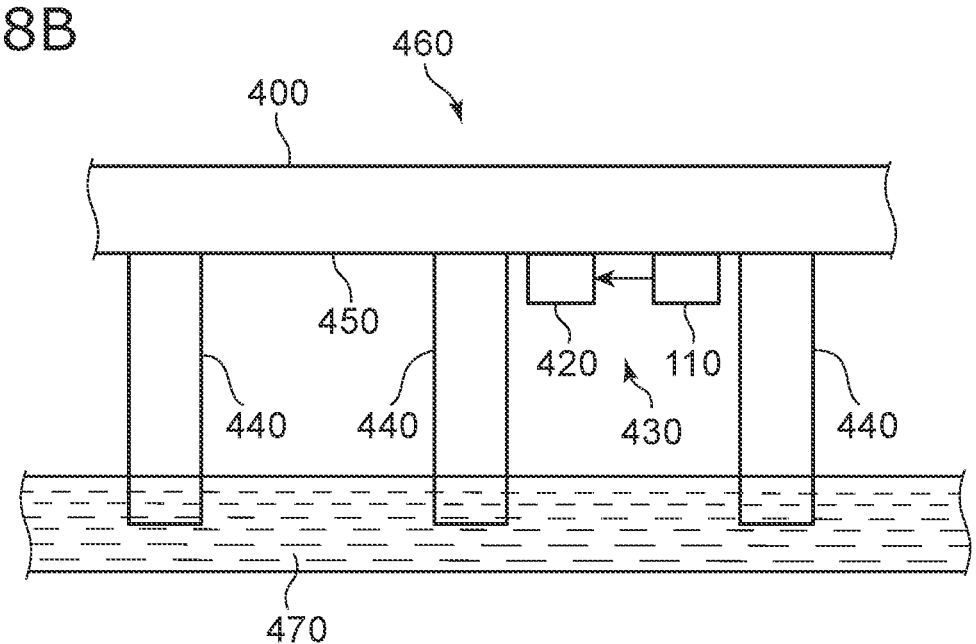

FIGS. 8A and 8B are schematic views illustrating applications of the electronic device.

As shown in FIG. 8A, a sensor 430 according to the fifth embodiment includes the sensor according to one of the first to third embodiments, and a transmission/reception part 420. In the example of FIG. 8A, the sensor 110 is illustrated as the sensor. The transmission/reception part 420 is configured to transmit the signal obtained from the sensor 110 by, for example, at least one of wireless and wired methods. The sensor 430 is provided on, for example, a slope surface 410 such as a road 400. The sensor 430 can monitor the state of, for example, a facility (e.g., infrastructure). The sensor 430 may be, for example, a state monitoring device.

For example, the sensor 430 detects a change in the state of a slope surface 410 of a road 400 with high accuracy. The change in the state of the slope surface 410 includes, for example, at least one of a change in the inclination angle and a change in the vibration state. The signal (inspection result) obtained from the sensor 110 is transmitted by the transmission/reception part 420. The status of a facility (e.g., infrastructure) can be monitored, for example, continuously.

As shown in FIG. 8B, the sensor 430 is provided, for example, in a portion of a bridge 460. The bridge 460 is provided above the river 470. For example, the bridge 460 includes at least one of a main girder 450 and a pier 440. The sensor 430 is provided on at least one of the main girder 450 and the pier 440. For example, at least one of the angles of the main girder 450 and the pier 440 may change due to deterioration or the like. For example, the vibration state may change in at least one of the main girder 450 and the pier 440. The sensor 430 detects these changes with high accuracy. The detection result can be transmitted to an arbitrary place by the transmission/reception part 420. Abnormalities can be detected effectively.

Embodiments include, for example, the following configurations (e.g., technological proposals).

Configuration 1

A sensor, comprising:

a base body;

a support portion fixed to the base body; and a first member supported by the support portion, a gap being provided between the base body and a part of the first member, the first member including a supported region, a first movable region, a first structure, a first support structure, a first connection structure, a first connect portion, and a first beam, the support portion being located between the base body and the supported region in a first direction from the base body to the support portion, the first beam extending along a second direction crossing the first direction, a first beam position of the first beam in the second direction being located between a first movable region position of the first movable region in the second direction and a support portion position of the support portion in the second direction, a first end of the first beam being connected to the first connecting structure, a first other end of the first beam being connected to the supported region, a first structure position of the first structure in the second direction being located between the first movable region position and the first beam position, a first connection structure position of the first connection structure in the second direction being located between the first structure position and the first beam position, a first support structure position of the first support structure in the second direction being located between the first structure position and the support portion position, the first structure including a first portion, a first other portion, and a first intermediate portion, a third direction from the first portion to the first other portion crossing a plane including the first direction and the second direction, the first intermediate portion being between the first portion and the first other portion, The first portion being connected to the first connection structure, the first other portion being connected to the first movable region, the first intermediate portion being connected to the first support structure, and the first connect portion connecting the first connection structure to the first support structure.

Configuration 2

The sensor according to Configuration 1, wherein a first length of the first connect portion along the third direction is longer than a second length of the first connect portion along the second direction.

Configuration 3

The sensor according to Configuration 1 or 2, wherein a first distance between the first portion and the first intermediate portion along the third direction is shorter than a second distance between the first intermediate portion and the first other portion along the third direction.

Configuration 4
The sensor according to any one of Configurations 1 to 3, wherein
the first member includes:
a first portion connect portion connecting the first portion to the first connection structure;
a first other portion connect portion connecting the first other portion to the first movable region; and
a first intermediate portion connect portion connecting the first intermediate portion to the first support structure.

Configuration 5
The sensor according to any one of Configurations 1 to 4, wherein
the first member includes a second structure, a second support structure, and a second connect portion,
a second structure position of the second structure in the second direction is located between the first movable region position and the first beam position,
a second support structure position of the second support structure in the second direction is located between the second structure position and the support portion position,
the second structure includes a second portion, a second other portion, and a second intermediate portion,
a direction from the second other portion to the second portion is along the third direction,
the second intermediate portion is located between the second other portion and the second portion,
the second portion is connected to the first connection structure,
the second other portion is connected to the first movable region,
the second intermediate portion is connected to the second support structure,
the second connect portion connects the first connection structure to the second support structure,
in the third direction, the first connection structure is located between at least a part of the second support structure and at least a part of the first support structure,
in the third direction, the first connect portion is located between the first connection structure and the at least the part of the first support structure, and
in the third direction, the second connect portion is located between the at least the part of the second support structure and the first connection structure.

Configuration 6
The sensor according to Configuration 5, further comprising:
a first electrode fixed to the base body; and
a first counter electrode fixed to the base body,
the first member further including a first beam electrode connected to the first beam, and a first counter beam electrode connected to the first beam,
in the third direction, the first beam being located between the first counter beam electrode and the first beam electrode,
the first electrode facing the first beam electrode, and
the first counter electrode facing the first counter beam electrode.

Configuration 7
The sensor according to Configuration 6, further comprising:
a controller,
the controller being configured to apply a driving signal including an AC component between the first electrode and the first beam electrode, and
the controller being configured to detect an electrical signal generated between the first counter electrode and the first counter beam electrode.

Configuration 8
The sensor according to Configuration 5, wherein
the first member includes a second movable region, a third structure, a third support structure, a second connection structure, a third connect portion, and a second beam,
in the second direction, the supported region is located between the first movable region and the second movable region,
the second beam extends along the second direction,
a second beam position of the second beam in the second direction is located between the support portion region and a second movable region position of the second movable region in the second direction,
a second end of the second beam is connected to the second connection structure,
a second end of the second beam is connected to the supported region,
a third structure position of the third structure in the second direction is located between the second beam position and the second movable region position,
a second connection structure position of the second connection structure in the second direction is located between the second beam position and the third structure position,
a third support structure position of the third support structure in the second direction is located between the support portion position and the third structure position,
the third structure includes a third portion, a third other portion, and a third intermediate portion,
a direction from the third portion to the third other portion is along the third direction;
the third intermediate portion is located between the third portion and the third other portion,
the third portion is connected to the second connection structure,
the third other portion is connected to the second movable region,
the third intermediate portion is connected to the third support structure, and
the third connect portion connects the second connection structure to the third support structure.

Configuration 9
The sensor according to Configuration 8, wherein
the first member includes a fourth structure, a fourth support structure, and a fourth connect portion,
a fourth structure position of the fourth structure in the second direction is located between the second beam position and the second movable region position,
a fourth support structure position of the fourth support structure in the second direction is between the support portion position and the fourth structure position,
the fourth structure includes a fourth portion, a fourth other portion, and a fourth intermediate portion,
a direction from the fourth other portion to the fourth portion is along the third direction,
the fourth intermediate portion is located between the fourth other portion and the fourth portion,
the fourth portion is connected to the second connection structure,
the fourth other portion is connected to the second movable region,
the fourth intermediate portion is connected to the fourth support structure, the fourth connect portion connects the second connection structure to the fourth support structure, in the third direction, the second connection structure is between at least a part of the fourth support structure and at least a part of the third support structure, in the third direction, the third connect portion is located between the second connection structure and the at least the part of the third support structure, and in the third direction, the fourth connect portion is located between the at least the part of the fourth support structure and the second connection structure.

Configuration 10

The sensor according to Configuration 9, further comprising:
a second electrode fixed to the base body; and
a second counter electrode fixed to the base body,
the first member further including a second beam electrode connected to the second beam, and a second counter beam electrode connected to the second beam,
in the third direction, the second beam being located between the second counter beam electrode and the second beam electrode,
the second electrode facing the second beam electrode, and
the second counter electrode facing the second counter beam electrode.

Configuration 11

The sensor according to Configuration 10, further comprising
a controller,
the controller being configured to apply a drive signal including an AC component between the second electrode and the second beam electrode, and
the controller being configured to detect an electrical signal generated between the second counter electrode and the second counter beam electrode.

Configuration 12

The sensor according to any one of Configurations 1 to 4, wherein
the first member includes a second structure, a second support structure, a second connect portion, and a first counter beam,
the first counter beam extends along the second direction,
a second structure position of the second structure in the second direction is between the first movable region position and a first counter beam position of the first counter beam in the second direction,
a first counter beam end of the first counter beam is connected to the first connecting structure,
a first counter beam other end of the first counter beam is connected to the supported region,
a second support structure position of the second support structure in the second direction is located between the second structure position and the support portion position,
the second structure includes a second portion, a second other portion, and a second intermediate portion,
a direction from the second other portion to the second portion is along the third direction,
the second intermediate portion is located between the second other portion and the second portion,
the second portion is connected to the first connection structure,
the second other portion is connected to the first movable region,
the second intermediate portion is connected to the second support structure, the second connect portion connects the first connection structure to the second support structure, in the third direction, the first connection structure is located between at least a part of the second support structure and at least a part of the first support structure, in the third direction, the first connect portion is located between the first connection structure and the at least the part of the first support structure, in the third direction, the second connect portion is located between the at least the part of the second support structure and the first connection structure, and in the third direction, the first counter beam is located between the second support structure and the first beam.

Configuration 13

The sensor according to Configuration 12, further comprising:
a first electrode fixed to the base body; and
a first counter electrode fixed to the base body,
the first member further including a first beam electrode connected to the first beam, and a first counter beam electrode connected to the first counter beam,
the first electrode facing the first beam electrode, and
the first counter electrode facing the first counter beam electrode.

Configuration 14

The sensor according to Configuration 13, further comprising
a controller,
the controller being configured apply a driving signal including an AC component between the first electrode and the first beam electrode, and
the controller being configured to detect an electrical signal generated between the first counter electrode and the first counter beam electrode.

Configuration 15

The sensor according to any one of Configurations 12 to 14, wherein
the first member includes a second movable region, a third structure, a third support structure, a second connection structure, a third connect portion, and a second beam,
in the second direction, the supported region is located between the first movable region and the second movable region,
the second beam extends along the second direction,
a second beam position of the second beam in the second direction is located between the support portion position and a second movable region position of the second movable region in the second direction,
a second end of the second beam is connected to the second connection structure,
a second other end of the second beam is connected to the supported region,
a third structure position of the third structure in the second direction is located between the second beam position and the second movable region position,
a second connection structure position of the second connection structure in the second direction is between the second beam position and the third structure position,
a third support structure position of the third support structure in the second direction is located between the support portion position and the third structure position,
the third structure includes a third portion, a third other portion, and a third intermediate portion, a direction from the third portion to the third other portion is along the third direction, the third intermediate portion is located between the third portion and the third other portion, the third portion is connected to the second connection structure, the third other portion is connected to the second movable region, the third intermediate portion is connected to the third support structure, the third connect portion connects the second connection structure to the third support structure, the first member includes a fourth structure, a fourth support structure, a fourth connect portion, and a second counter beam, the second counter beam extends along the second direction, a fourth structure position of the fourth structure in the second direction is located between a second counter beam position of the second counter beam in the second direction and the second movable region position, a second counter beam end of the second counter beam is connected to the second connecting structure, a second counter beam other end of the second counter beam is connected to the supported region, a fourth support structure position of the fourth support structure in the second direction is located between the support portion position and the fourth structure position, the fourth structure includes a fourth portion, a fourth other portion, and a fourth intermediate portion, a direction from the fourth other portion to the fourth portion is along the third direction, the fourth intermediate portion is located between the fourth other portion and the fourth portion, the fourth portion is connected to the second connection structure, the fourth other portion is connected to the second movable region, the fourth intermediate portion is connected to the fourth support structure, the fourth connection portion connects the second connection structure to the fourth support structure, in the third direction, the second connection structure is located between at least a part of the fourth support structure and at least a part of the third support structure, in the third direction, the third connection portion is located between the second connection structure and the at least the part of the third support structure, in the third direction, the fourth connection portion is located between the at least the part of the fourth support structure and the second connection structure, and in the third direction, the second counter beam is located between the fourth support structure and the second beam.

Configuration 16

The sensor according to Configuration 15, wherein the first member further includes a fourth movable region and a fourth movable region connect portion, a position of the fourth support structure in the third direction is located between a position of the fourth movable region in the third direction and a position of the supported region in the third direction, and the fourth movable region connect portion connects the fourth support structure to the fourth movable region.

Configuration 17

The sensor according to Configuration 8, wherein the first member further includes a third movable region and a third movable region connect portion, a position of the third support structure in the third direction is located between a position of the supported region in the third direction and a position of the third movable region in the third direction, and the third movable region connect portion connects the third support structure to the third movable region.

Configuration 18

The sensor according to Configuration 5, wherein the first member further includes a fourth movable region and a second movable region connect portion; and a position of the second support structure in the third direction is located between a position of the fourth movable region in the third direction and a position of the supported region in the third direction.

Configuration 19

The sensor according to Configuration 1, wherein the first member further includes a third movable region and a first movable region connect portion, a position of the first support structure in the third direction is located between a position of the supported region in the third direction and a position of the third movable region in the third direction, and the first movable region connect portion connects the first support structure to the third movable region.

Configuration 20

An electronic device, comprising:

the sensor according to any one of Configurations 1 to 19; and a circuit controller configured to control a circuit based on a signal obtained from the sensor.

According to embodiments, a sensor and an electronic device capable of improving characteristics can be provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as base bodies, support portions, first portions, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and electronic devices practicable by an appropriate design modification by one skilled in the art based on the sensors and the electronic devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a base body;
a support portion fixed to the base body; and
a first member supported by the support portion,
a gap being provided between the base body and a part of the first member,
the first member including a supported region, a first movable region, a first structure, a first support structure, a first connection structure, a first connect portion, and a first beam,
the support portion being located between the base body and the supported region in a first direction from the base body to the support portion,
the first beam extending along a second direction crossing the first direction,
a first beam position of the first beam in the second direction being located between a first movable region position of the first movable region in the second direction and a support portion position of the support portion in the second direction,
a first end of the first beam being connected to the first connection structure,
a first other end of the first beam being connected to the supported region,
a first structure position of the first structure in the second direction being located between the first movable region position and the first beam position,
a first connection structure position of the first connection structure in the second direction being located between the first structure position and the first beam position,
a first support structure position of the first support structure in the second direction being located between the first structure position and the support portion position,
the first structure including a first portion, a first other portion, and a first intermediate portion,
a third direction from the first portion to the first other portion crossing a plane including the first direction and the second direction,
the first intermediate portion being between the first portion and the first other portion,
the first portion being connected to the first connection structure,
the first other portion being connected to the first movable region,
the first intermediate portion being connected to the first support structure, and
the first connect portion connecting the first connection structure to the first support structure.

2. The sensor according to claim 1, wherein a first length of the first connect portion along the third direction is longer than a second length of the first connect portion along the second direction.

3. The sensor according to claim 1, wherein a first distance between the first portion and the first intermediate portion along the third direction is shorter than a second distance between the first intermediate portion and the first other portion along the third direction.

4. The sensor according to claim 1, wherein
the first member includes:
a first portion connect portion connecting the first portion to the first connection structure;
a first other portion connect portion connecting the first other portion to the first movable region; and
a first intermediate portion connect portion connecting the first intermediate portion to the first support structure.

5. The sensor according to claim 1, wherein
the first member includes a second structure, a second support structure, and a second connect portion,
a second structure position of the second structure in the second direction is located between the first movable region position and the first beam position,
a second support structure position of the second support structure in the second direction is located between the second structure position and the support portion position,
the second structure includes a second portion, a second other portion, and a second intermediate portion,
a direction from the second other portion to the second portion is along the third direction,
the second intermediate portion is located between the second other portion and the second portion,
the second portion is connected to the first connection structure,
the second other portion is connected to the first movable region,
the second intermediate portion is connected to the second support structure,
the second connect portion connects the first connection structure to the second support structure,
in the third direction, the first connection structure is located between at least a part of the second support structure and at least a part of the first support structure,
in the third direction, the first connect portion is located between the first connection structure and the at least the part of the first support structure, and
in the third direction, the second connect portion is located between the at least the part of the second support structure and the first connection structure.

6. The sensor according to claim 5, further comprising:
a first electrode fixed to the base body; and
a first counter electrode fixed to the base body,
the first member further including a first beam electrode connected to the first beam, and a first counter beam electrode connected to the first beam,
in the third direction, the first beam being located between the first counter beam electrode and the first beam electrode,
the first electrode facing the first beam electrode, and
the first counter electrode facing the first counter beam electrode.

7. The sensor according to claim 6, further comprising:
a controller,
the controller being configured to apply a driving signal including an AC component between the first electrode and the first beam electrode, and
the controller being configured to detect an electrical signal generated between the first counter electrode and the first counter beam electrode.

8. The sensor according to claim 7, wherein
the first member includes a second movable region, a third structure, a third support structure, a second connection structure, a third connect portion, and a second beam, in the second direction, the supported region is located between the first movable region and the second movable region, the second beam extends along the second direction, a second beam position of the second beam in the second direction is located between the support portion position and a second movable region position of the second movable region in the second direction, a second end of the second beam is connected to the second connection structure, a second other end of the second beam is connected to the supported region, a third structure position of the third structure in the second direction is located between the second beam position and the second movable region position, a second connection structure position of the second connection structure in the second direction is located between the second beam position and the third structure position, a third support structure position of the third support structure in the second direction is located between the support portion position and the third structure position, the third structure includes a third portion, a third other portion, and a third intermediate portion, a direction from the third portion to the third other portion is along the third direction;

the third intermediate portion is located between the third portion and the third other portion, the third portion is connected to the second connection structure, the third other portion is connected to the second movable region, the third intermediate portion is connected to the third support structure, and the third connect portion connects the second connection structure to the third support structure.

9. The sensor according to claim 8, wherein the first member includes a fourth structure, a fourth support structure, and a fourth connect portion, a fourth structure position of the fourth structure in the second direction is located between the second beam position and the second movable region position, a fourth support structure position of the fourth support structure in the second direction is between the support portion position and the fourth structure position, the fourth structure includes a fourth portion, a fourth other portion, and a fourth intermediate portion, a direction from the fourth other portion to the fourth portion is along the third direction, the fourth intermediate portion is located between the fourth other portion and the fourth portion, the fourth portion is connected to the second connection structure, the fourth other portion is connected to the second movable region, the fourth intermediate portion is connected to the fourth support structure, the fourth connect portion connects the second connection structure to the fourth support structure, in the third direction, the second connection structure is between at least a part of the fourth support structure and at least a part of the third support structure, in the third direction, the third connect portion is located between the second connection structure and the at least the part of the third support structure, and in the third direction, the fourth connect portion is located between the at least the part of the fourth support structure and the second connection structure.

10. The sensor according to claim 9, further comprising:

a second electrode fixed to the base body; and a second counter electrode fixed to the base body, the first member further including a second beam electrode connected to the second beam, and a second counter beam electrode connected to the second beam, in the third direction, the second beam being located between the second counter beam electrode and the second beam electrode, the second electrode facing the second beam electrode, and the second counter electrode facing the second counter beam electrode.

11. The sensor according to claim 10, further comprising a controller, the controller being configured to apply a drive signal including an AC component between the second electrode and the second beam electrode, and the controller being configured to detect an electrical signal generated between the second counter electrode and the second counter beam electrode.

12. The sensor according to claim 1, wherein the first member includes a second structure, a second support structure, a second connect portion, and a first counter beam, the first counter beam extends along the second direction, a second structure position of the second structure in the second direction is between the first movable region position and a first counter beam position of the first counter beam in the second direction, a first counter beam end of the first counter beam is connected to the first connection structure, a first counter beam other end of the first counter beam is connected to the supported region, a second support structure position of the second support structure in the second direction is located between the second structure position and the support portion position, the second structure includes a second portion, a second other portion, and a second intermediate portion, a direction from the second other portion to the second portion is along the third direction, the second intermediate portion is located between the second other portion and the second portion, the second portion is connected to the first connection structure, the second other portion is connected to the first movable region, the second intermediate portion is connected to the second support structure, the second connect portion connects the first connection structure to the second support structure, in the third direction, the first connection structure is located between at least a part of the second support structure and at least a part of the first support structure, in the third direction, the first connect portion is located between the first connection structure and the at least the part of the first support structure, in the third direction, the second connect portion is located between the at least the part of the second support structure and the first connection structure, and in the third direction, the first counter beam is located between the second support structure and the first beam.

13. The sensor according to claim 12, further comprising:
a first electrode fixed to the base body; and
a first counter electrode fixed to the base body,
the first member further including a first beam electrode connected to the first beam, and a first counter beam electrode connected to the first counter beam,
the first electrode facing the first beam electrode, and
the first counter electrode facing the first counter beam electrode.

14. The sensor according to claim 13, further comprising a controller,
the controller being configured apply a driving signal including an AC component between the first electrode and the first beam electrode, and
the controller being configured to detect an electrical signal generated between the first counter electrode and the first counter beam electrode.

15. The sensor according to claim 12, wherein
the first member includes a second movable region, a third structure, a third support structure, a second connection structure, a third connect portion, and a second beam,
in the second direction, the supported region is located between the first movable region and the second movable region,
the second beam extends along the second direction,
a second beam position of the second beam in the second direction is located between the support portion position and a second movable region position of the second movable region in the second direction,
a second end of the second beam is connected to the second connection structure,
a second other end of the second beam is connected to the supported region,
a third structure position of the third structure in the second direction is located between the second beam position and the second movable region position,
a second connection structure position of the second connection structure in the second direction is between the second beam position and the third structure position,
a third support structure position of the third support structure in the second direction is located between the support portion position and the third structure position,
the third structure includes a third portion, a third other portion, and a third intermediate portion,
a direction from the third portion to the third other portion is along the third direction,
the third intermediate portion is located between the third portion and the third other portion,
the third portion is connected to the second connection structure,
the third other portion is connected to the second movable region,
the third intermediate portion is connected to the third support structure,
the third connect portion connects the second connection structure to the third support structure,
the first member includes a fourth structure, a fourth support structure, a fourth connect portion, and a second counter beam,
the second counter beam extends along the second direction,
a fourth structure position of the fourth structure in the second direction is located between a second counter beam position of the second counter beam in the second direction and the second movable region position,
a second counter beam end of the second counter beam is connected to the second connection structure,
a second counter beam other end of the second counter beam is connected to the supported region,
a fourth support structure position of the fourth support structure in the second direction is located between the support portion position and the fourth structure position,
the fourth structure includes a fourth portion, a fourth other portion, and a fourth intermediate portion,
a direction from the fourth other portion to the fourth portion is along the third direction,
the fourth intermediate portion is located between the fourth other portion and the fourth portion,
the fourth portion is connected to the second connection structure,
the fourth other portion is connected to the second movable region,
the fourth intermediate portion is connected to the fourth support structure,
the fourth connection portion connects the second connection structure to the fourth support structure,
in the third direction, the second connection structure is located between at least a part of the fourth support structure and at least a part of the third support structure,
in the third direction, the third connection portion is located between the second connection structure and the at least the part of the third support structure,
in the third direction, the fourth connection portion is located between the at least the part of the fourth support structure and the second connection structure, and
in the third direction, the second counter beam is located between the fourth support structure and the second beam.

16. The sensor according to claim 15, wherein
the first member further includes a third movable region, a fourth movable region, a first movable region connect portion, a second movable region connect region, a third movable region connect portion, and a fourth movable region connect portion,
a position of the fourth support structure in the third direction is located between a position of the fourth movable region in the third direction and a position of the supported region in the third direction, and
the fourth movable region connect portion connects the fourth support structure to the fourth movable region.

17. The sensor according to claim 8, wherein
the first member further includes a third movable region, a first movable region connect portion, a second movable region connect portion, and a third movable region connect portion,
a position of the third support structure in the third direction is located between a position of the supported region in the third direction and a position of the third movable region in the third direction, and
the third movable region connect portion connects the third support structure to the third movable region.

18. The sensor according to claim 5, wherein
the first member further includes a second movable region, a third movable region, a fourth movable region and a second movable region connect portion; and
a position of the second support structure in the third direction is located between a position of the fourth movable region in the third direction and a position of the supported region in the third direction.

19. The sensor according to claim 1, wherein
the first member further includes a second movable region, a third movable region, and a first movable region connect portion,
a position of the first support structure in the third direction is located between a position of the supported region in the third direction and a position of the third movable region in the third direction, and
the first movable region connect portion connects the first support structure to the third movable region.

20. An electronic device, comprising:
the sensor according to claim 1; and
a circuit controller configured to control a circuit based on a signal obtained from the sensor.

* * * * *